July 7, 1964
R. W. BOYLE
3,139,684
EXTENSOMETER FOR MEASURING DEFLECTION
OF A CRACKED PLATE SPECIMEN
Filed Aug. 29, 1961
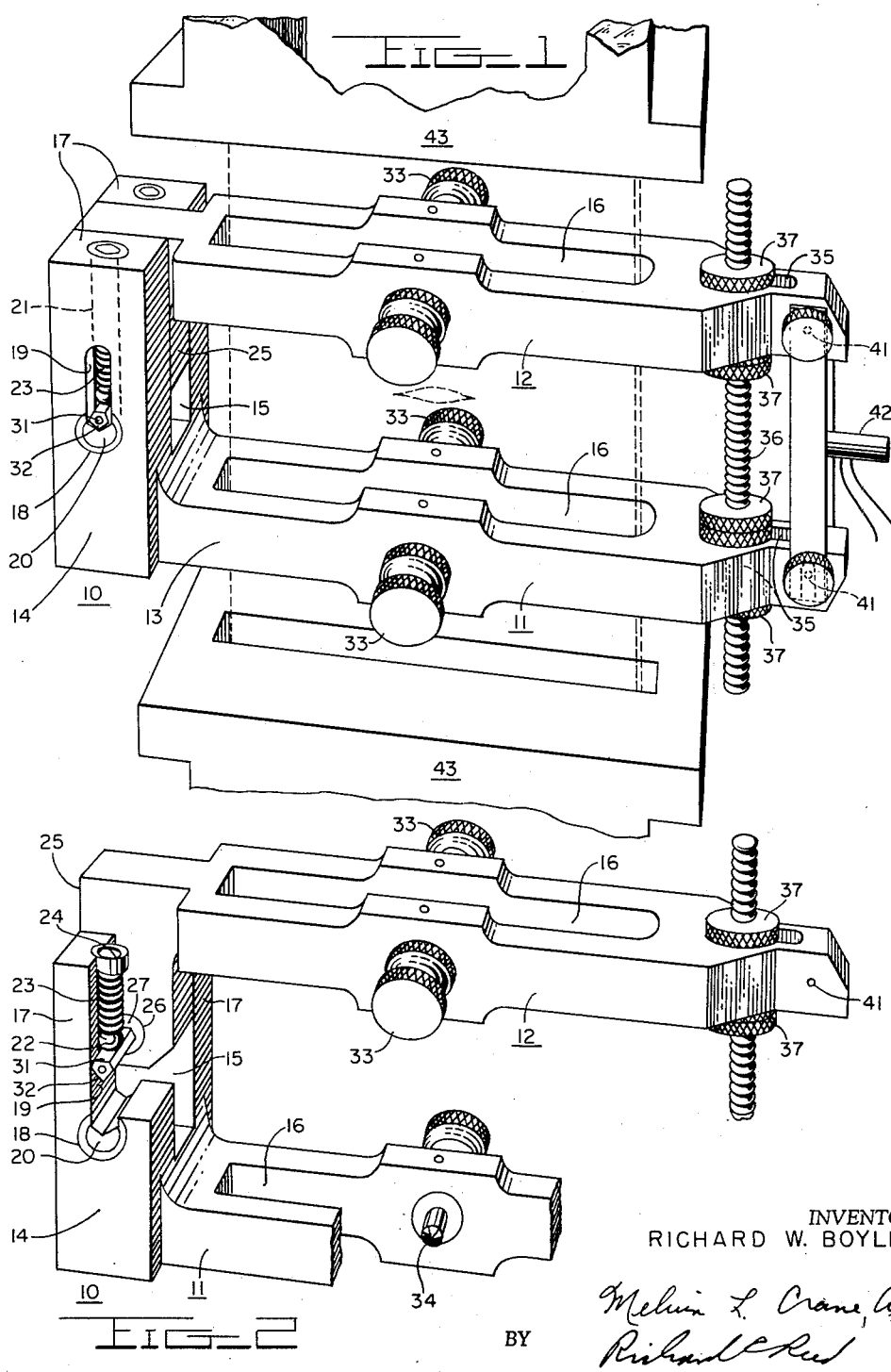
INVENTOR
RICHARD W. BOYLE
BY
ATTORNEY

United States Patent Office 3,139,684
Patented July 7, 1964

3,139,684
EXTENSOMETER FOR MEASURING DEFLECTION OF A CRACKED PLATE SPECIMEN
Richard W. Boyle, 5446 Taney Ave., Alexandria, Va.
Filed Aug. 29, 1961, Ser. No. 134,783
3 Claims. (Cl. 33—143)
(Granted under Title 35, U.S. Code (1952), sec. 266)

The invention described herein may be manufactured and used by or for the Government of the United States of America for governmental purposes without the payment of any royalties thereon or therefor.

The present invention is directed to a device for determining the growth of a crack in a test specimen and more particularly to an extensometer adaptor for accurately determining the growth of a crack in a test specimen under an applied load.

Heretofore the prior art method of determining crack growth of a test specimen has only been approximated by placing ink in the notch root and allowing the ink to run into the crack as the crack opens due to a load applied on the specimen. This has the disadvantage of only defining the terminal point without any means of determining what happened during the test.

The present invention overcomes the objection of the prior art method by use of an extensometer adaptor which is mounted directly onto the test specimen and any deflection in the test specimen will be directed to the extensometer adaptor. The adaptor deflects directly with the specimen extension and by use of a microformer connected to one end of the adaptor a load-extension diagram is traced as the test is in progress. If the crack extends without general plastic deformation, the load and extension can be used to determine crack length. Thus the device of the present invention makes a record of the crack extension as the test is made and permits a recording of it to the end of the test.

It is therefore an object of the present invention to provide a simple, accurate and easily built device used for determining the growth of a crack from a notch in a thin plate test specimen.

Another object is to provide a device which can be easily mounted onto a test specimen and left unattended and yet provide an accurate measure of crack growth from a notch in a test specimen.

Still another object is to provide a device for an accurate determination of crack growth in a test specimen which has means for protecting the device from the shock incident to final specimen failure.

Other objects of this invention will become apparent upon a more careful consideration of the following detailed description when taken together with the accompanying drawings, in which:

FIG. 1 is a view in perspective which illustrates the adaptor in operative use for a test; and
FIG. 2 is a cut-away view illustrating the relative parts of the adaptor.

The extensometer adaptor of the present invention is made in two sections which are pivotably connected at one end such that the two sections can pivot about a fulcrum at the connected ends. The sections are formed with slots therein such that the slots are in alignment. The adaptor is slipped over the notched test specimen with the specimen passing through the slots. Each section of the adaptor is secured to the test specimen at equal points on opposite sides of the notch by screws which pass through the arms of the sections at right angles to the specimen. As the specimen cracks the arms of the adaptor will move accordingly. A microformer or another suitable displacement indicative device is connected to the free ends of the sections and as the arms rotate about the pivot connection due to the slight lengthening of the specimen due to the crack, the microformer or any other suitable indicator records the movement indicative of the crack extension.

Now referring to the drawings, there is illustrated in the different views an extensometer adaptor 10 which is formed by two sections 11 and 12 which are pivotably connected at one end and have free ends at the other. Section 11 is formed by a slotted arm portion 13 which has a bifurcated end 14 at a right angle to the arm portion to form legs 17. Each leg 17 is provided with a hole 18 which meets with a slot 19 in the leg at a right angle with the slit 15 in the end 14. The hole 18 has a pivot bushing 20 inserted therein such that the pivot surface faces the slot 19. A hole 21 is bored into the end of the legs 17 such that the hole meets with the slot 19 and a ball bearing 22 and a spring 23 is inserted into the hole and held in place by a set screw 24. The set screw can be used to adjust the compression of the spring on the ball bearing.

Section 12 is similar to section 11 except the pivot end is made to mate with section 11 to provide a pivot connection between the two sections. As such, section 12 has a slotted arm portion and an end portion 25 at right angles to the arm portion. The end portion 25 is machined down such that the end portion 25 extends in the same direction as the slot 16 in the arm portion. The end portion 25 will slide into the slot 15 of section 11 with a loose fit to enable the sections to pivot relative to each other. The end portion 25 has a hole 26 bored through it and a bushing 27 is pressed into the hole 26. A triangular pin 31 having a knife edge 32 is made to be press fitted into the bushing 27 and provides the pivot for the two sections.

In assembling the device, the end portion 25 of section 12 is mated into the bifurcated end portion of section 11 and then the triangular pin 31 is inserted through the slot 19 in one of the legs of section 11 and through the bushing 27 such that the knife edge of the pin is toward the pivot bushing 20 in the legs of section 11. The ball bearing and spring assembly is then inserted into holes 21 such that the ball bearing applies a pressure on the flat side of the pin to hold the knife edge against the pivot bushing in each of the legs.

The arm of each section is provided with opposing set screws 33 that are screw threaded through the arms perpendicular to the slot therein and at about the mid-point of the length of the slots in the arms. These set screws are provided with pointed tips 34 which fit into opposing recesses made into a test specimen on opposite sides thereof and equally spaced from a notch formed in the test specimen.

Near the ends of the arms opposite to the pivotal end and parallel to slots 16, apertures 35 are made through the arms through which a threaded rod or spacer bar 36 is positioned. The threaded rod is provided with nuts 37 on opposite sides of the arms such that the rod can be secured in place to the arm or have a loose fit by use of lock nuts as shown. The purpose of the spacer bar is to prevent excessive excursion of the arms so as to reduce the danger of breakage of the knife edge, rod or other parts due to the ends flying apart upon rupture of the test specimen.

The ends of the arms are provided with indentations or recess 41 for the purpose of connecting associated equipment such as a microformer 42 used for making a recording to determine the crack growth. The microformer is well known in the art and shown in block form only for simplicity.

In operation, a test specimen having a notch therein is positioned through the slots in the arms and the set screws are secured in the recesses in the test specimen such that the set screws are equally spaced from the notch. The test specimen is secured in suitable holders 43 in a machine for applying a tension load on the test specimen. The test specimen under sufficient load will crack from the notch made in the specimen and as the specimen stretches, the arms of the extensometer will move apart. The instrumentation connected to the free ends of the adaptor will record the extension as intercoupled by the adaptor. The specimen will grow in length as the crack is formed and the adaptor measures the growth in length. As the specimen ruptures a large force will be applied to the arms which will tend to snap the free ends apart. The spacer bar is set sufficiently to permit an entire measure of the growth of the crack but it will prevent the ends from snapping apart. As the rupture force is applied to the adaptor arms, a force will also be applied at the pivot connection. The triangular pin will then be forced against the springs in the legs and the springs will permit the pivot end to move along the slot in the legs. Thus the spacer bar and the spring loaded end prevent any damage to the adaptor upon rupture of the test specimen.

It can be seen that the adaptor takes up very little room and can be used many times to run tests on different specimen with great accuracy. Such an adaptor removes the guesswork involved in determining the growth of a crack in a notched specimen.

Obviously many modifications and variations of the present invention are possible in the light of the above teachings. It is therefore to be understood that within the scope of the appended claims the invention may be practiced otherwise than as specifically described.

What is claimed is:

1. An extensometer adaptor for determining the growth of a crack from a notch formed in a test specimen which comprises first and second sections, said first section including a slotted arm with a bifurcated end portion extending therefrom at about a right angle, said second section including a slotted arm with a solid end portion extending therefrom at about a right angle thereto, said end portion of said second section mating with the end portion of said first section with the slots of each arm portion of each of said sections extending in the same direction with their slots along the same axis through the length of the arms, said second section being pivotally connected with the bifurcated end of said first section by a pin, said pin having triangular ends to form a knife edge, a pivot bushing cooperating with said pin to provide a pivot about a fulcrum at the mated ends, spring means associated with said bifurcated end portion of said first section and said pin to force said knife edge of said pin against the pivot bushing, said first and second sections adapted for relative movement along a line through the pivot upon rupture of said test specimen, means associated with said slots in each arm to secure the adaptor to said specimen with the arm of each of said sections secured on opposite sides of said notch in said specimen, and means associated with said arms to record a movement of said arms as a crack is formed at said notch in said specimen.

2. An extensometer adaptor as claimed in claim 1 wherein said means for securing said arms to said test specimen are opposing screws which pass through the arm perpendicular to the slots therein.

3. An extensometer adaptor as claimed in claim 1 which comprises means for limiting the pivotal rotation of said first and second section relative to each other.

References Cited in the file of this patent

UNITED STATES PATENTS

| 1,827,093 | McCabe | Oct. 13, 1931 |
| 2,578,066 | Hyde | Dec. 11, 1951 |
| 2,666,262 | Ruge | Jan. 19, 1954 |
| 2,983,326 | Williams | May 9, 1961 |

FOREIGN PATENTS

| 131,444 | Great Britain | Aug. 20, 1919 |
| 302,633 | Great Britain | Dec. 19, 1928 |